March 4, 1947.  G. H. PALM  2,416,947
DISCHARGE PRESSURE CONTROLLED HYDRAULICALLY
OPERATED DISPENSING PUMP
Filed April 30, 1943  4 Sheets-Sheet 1
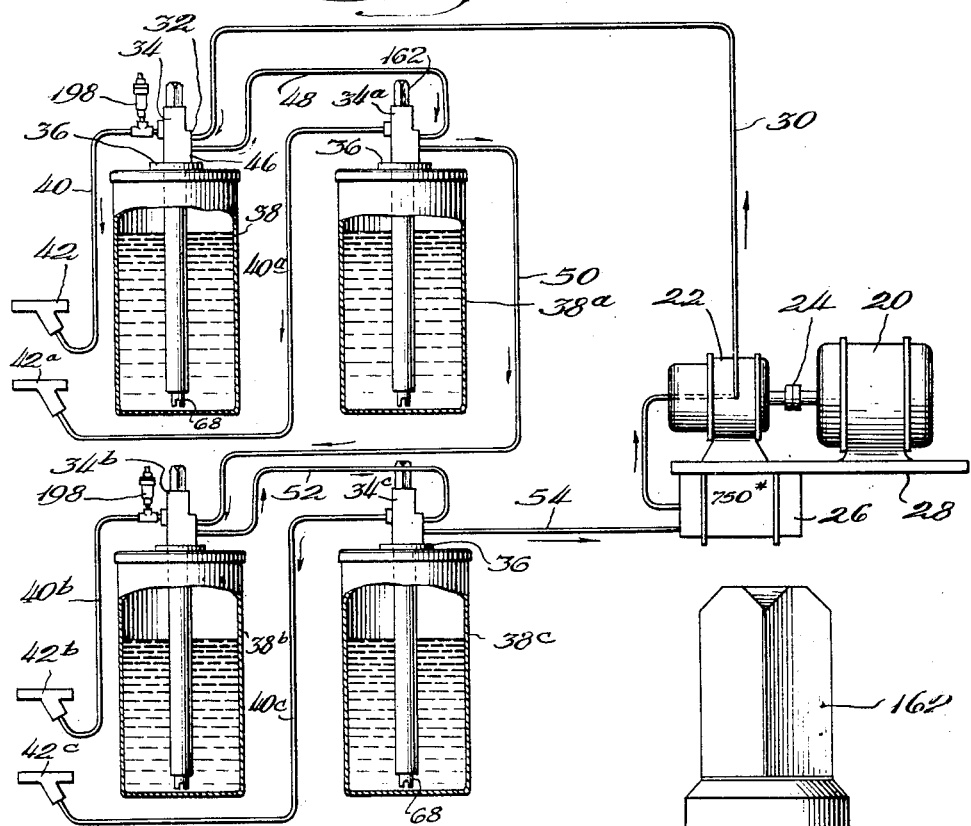
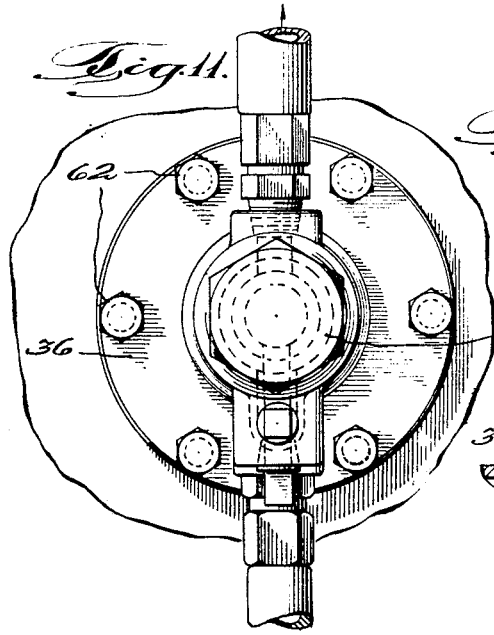
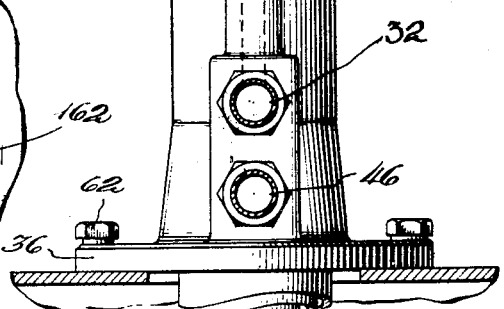

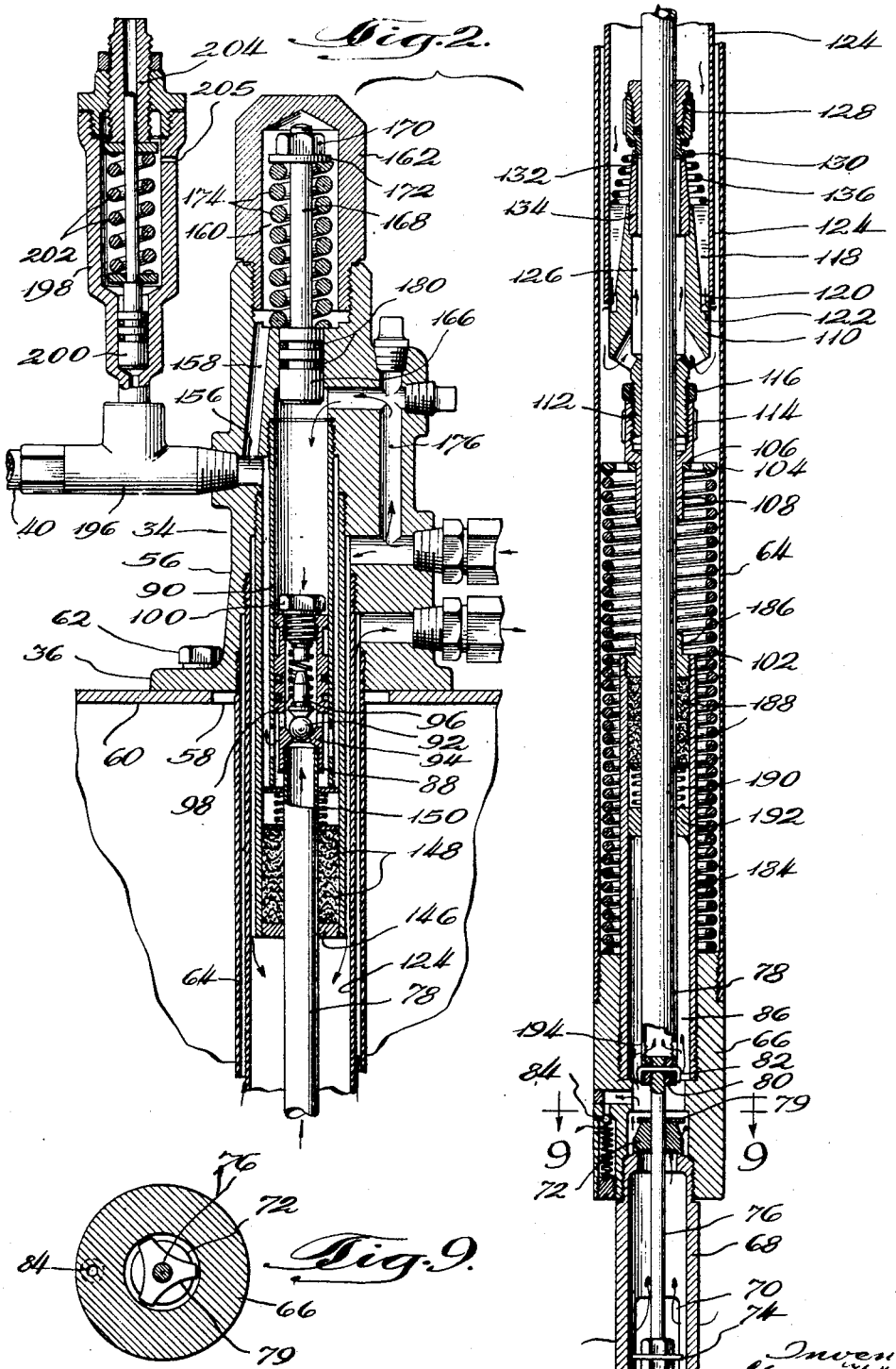

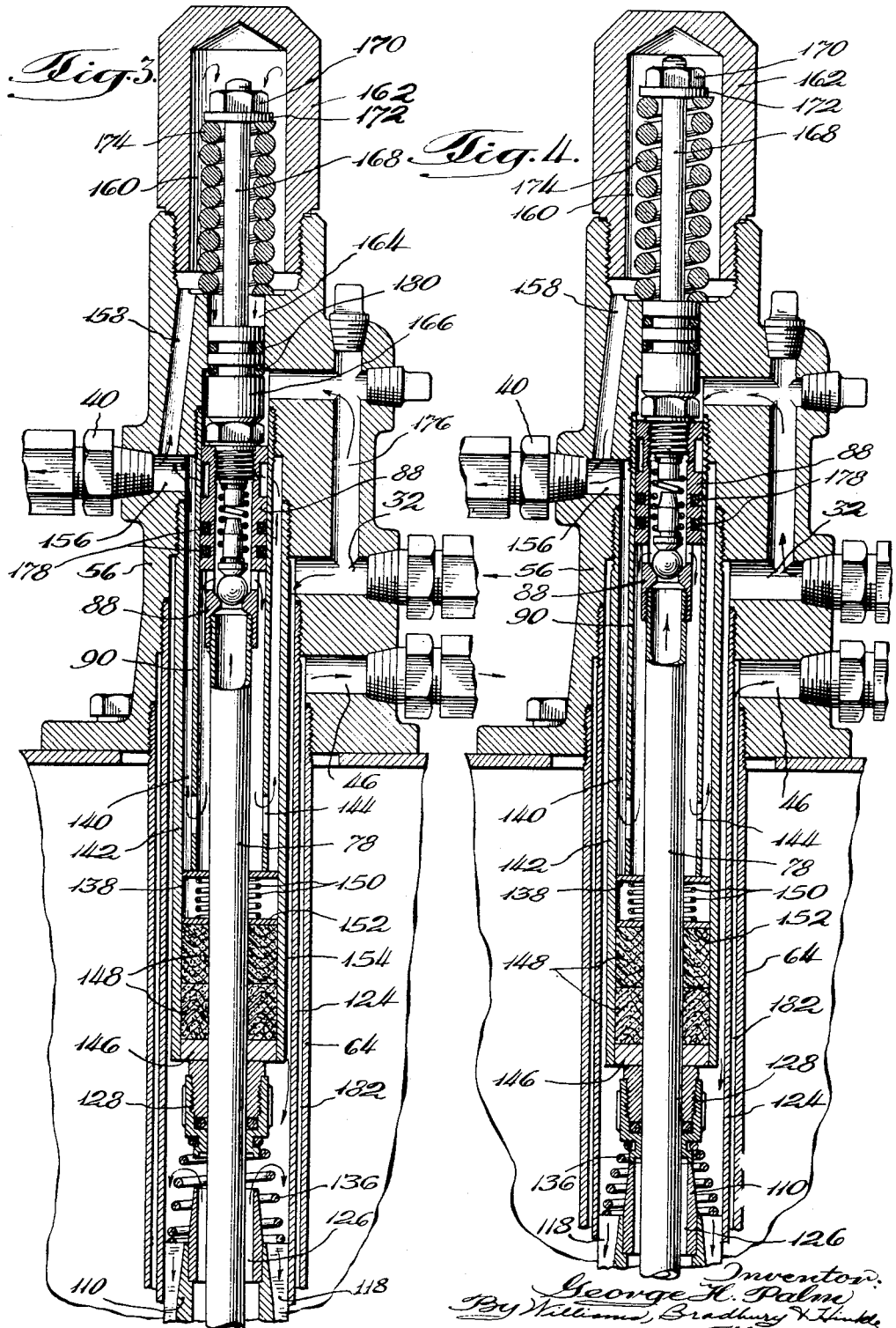

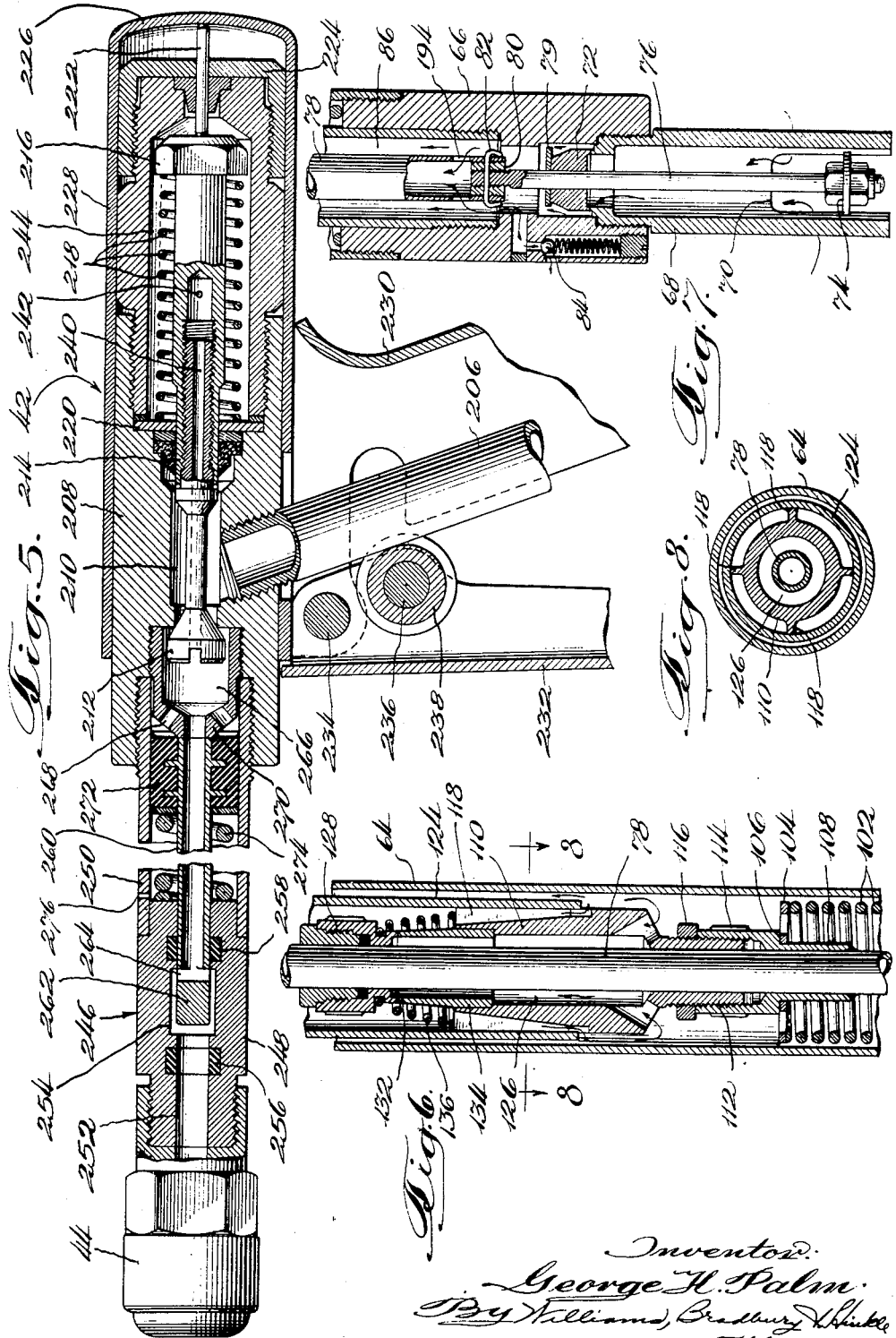

Patented Mar. 4, 1947

2,416,947

UNITED STATES PATENT OFFICE 2,416,947

DISCHARGE PRESSURE CONTROLLED HYDRAULICALLY OPERATED DISPENSING PUMP

George H. Palm, Chicago, Ill., assignor to Stewart-Warner Corporation, Chicago, Ill., a corporation of Virginia Application April 30, 1943, Serial No. 485,097

21 Claims. (Cl. 222—135)

My invention relates to lubricating systems and more particularly to power operated lubricating systems of the kind used in garages and service stations to lubricate the bearings of automobiles and similar vehicles.

In present automotive practice it is usual to equip the chassis bearings of automobiles with nipples or fittings and to lubricate these bearings by attaching the coupler of a lubricant compressor successively to the various fittings located at different points on the automobile chassis.

Most of the bearings of an automobile offer only moderate resistance to the in-flow of lubricant and a lubricant pressure of 3,000 pounds is adequate to lubricate practically all of the bearings encountered. Occasionally, however, a stiff or tight bearing may be encountered which requires the use of lubricant pressures up to 7,000 or 8,000 pounds per square inch and it is usual to make power operated lubricating systems which are capable of providing the 7,000 or 8,000 pounds pressure necessary to lubricate such occasional bearings.

This means that all of the parts of the lubricating system must be made strong enough to withstand this 7,000 or 8,000 pounds pressure and that the electric or air operated pump must be capable of producing these high pressures. All of this greatly increases the expense of the lubricating system and reduces its efficiency by reducing the volume of lubricant discharged, since the amount of lubricant which can be discharged by a motor operated pump intended to deliver lubricant under 7,000 or 8,000 pounds pressure is much less than can be discharged by a similar pump using the same size motor but intended to deliver lubricant under not more than 3,000 pounds pressure.

An object of my invention is to provide a new and improved lubricating system wherein the motor driven pump, hose and various accessories are designed for a pressure of about 3,000 pounds per square inch, but which is provided adjacent the coupler with an automatic booster for increasing the lubricant pressure at the bearing to 7,000 or 8,000 pounds per square inch when the bearing resistance makes such a lubricant pressure necessary for proper lubrication.

Another object of my invention is to provide a lubricating system wherein all of the parts, except the coupler and booster adjacent thereto, may be made of relatively inexpensive materials and by inexpensive methods satisfactory to withstand lubricant pressures of approximately 3,000 pounds per square inch.

Another object of my invention is to provide a lubricating system wherein a single power unit provides the operating force for a plurality of lubricant compressors adapted to handle the same or different lubricants.

Another object of my invention is to provide a simple and efficient lubricating system which is less expensive to manufacture and install and which is more flexible in use than the lubricating systems now available.

Another object of my invention is to provide a new and improved lubricant compressor.

Another object of my invention is to provide a new and improved booster arrangement for increasing the lubricant pressure only when necessary to effect the desired lubrication.

Other objects and advantages will become apparent as the description proceeds.

In the drawings:

Fig. 1 is a diagrammatic representation of a preferred form of lubricating system embodying my invention;

Fig. 2 is a longitudinal, sectional view through one of the lubricant compressors showing the position assumed by the parts at the completion of a discharge stroke;

Fig. 3 is a partial, longitudinal, sectional view of the lubricant compressor showing certain parts in the position assumed when the lubricant compressor is idle;

Fig. 4 is a view similar to Fig. 3, but showing the parts at the beginning of the discharge stroke;

Fig. 5 is a sectional view showing the control valve and booster mechanism;

Fig. 6 is an enlarged view of a portion of Fig. 2 showing certain valve mechanism;

Fig. 7 is an enlarged view of that portion of Fig. 2 showing the lower or lubricant inlet end of the lubricant compressor;

Fig. 8 is a transverse section of the lubricant compressor taken on the line 8—8 of Fig. 6;

Fig. 9 is a transverse section of the lubricant compressor taken on the line 9—9 of Fig. 2;

Fig. 10 is a side elevation of the upper end of a lubricant compressor illustrating the manner in which such a compressor is mounted in a lubricant drum or other container; and Fig. 11 is a top plan view of the structure shown in Fig. 10.

The diagrammatic representation constituting Fig. 1 of the drawings is intended merely to indicate a typical installation embodying my invention and is not to be construed as meaning that my invention is limited to the particular number of units or arrangement thereof shown in this figure. In that embodiment of my invention represented in this figure, an electric motor 20 drives a gear pump or any other suitable type of pump 22 through a flexible coupling 24. The pump 22 is supplied with a primary fluid, such as light turbine oil, or any other suitable liquid, from a reservoir 26 which may be located in unitary relationship to the pump and motor, as shown, or may be placed in any other suitable position. The particular arrangement of the pump, reservoir and motor merely forms a convenient unitary assembly which can be mounted on a single base 28 and can be positioned in any desired location in the garage or service station.

The primary fluid discharged by the pump 22 flows through a pipe 30 to the primary inlet 32 of a lubricant compressor 34. The compressor 34 has a flange 36 adapted to overlie the opening in the top of a lubricant drum 38 so that the lower or inlet end of the compressor is located just above the bottom of the drum 38. The compressor 34 discharges lubricant through a discharge hose 40 leading to a control valve 42 provided with a coupler 44 (Fig. 5) for temporary attachment to the lubricant fitting or nipple permanently mounted on the chassis bearings of an automobile or other vehicle.

When the compressor 34 is not being used, the primary fluid flows freely from the primary inlet 32 to the primary outlet 46 and through pipe 48 to the next lubricant compressor 34a, which may be identical with the compressor 34 and similarly mounted in a second lubricant drum 38a, which may contain the same or a different lubricant. The compressor 34a is provided with a lubricant discharge hose 40a leading to a control valve 42a, which may be identical in all respects with the control valve 42.

When both compressors 34 and 34a are idle, the primary fluid flows freely through both of these compressors and into a pipe 50 leading to a third lubricant compressor 34b mounted in a lubricant drum 38b, having a lubricant discharge hose 40b leading to a control valve 42b. When lubricant compressors 34, 34a and 34b are idle, the primary fluid flows freely into pipe 52 leading to a fourth lubricant compressor 34c, mounted in a lubricant drum 38c. The compressor 34c has a discharge hose 40c leading to a control valve 42c and a primary fluid return line 54 connects the compressor 34c with the reservoir 26.

A feature of my invention lies in the fact that the pump 22 discharges the primary fluid at a pressure not exceeding 750 pounds per square inch in a typical installation and the pipes 30, 48, 50, 52 and 54 are only required to stand this pressure. The lubricant compressors on the other hand are designed to multiply this pressure four fold and to discharge lubricant into their several discharge hoses at a pressure not exceeding 3000 pounds per square inch.

This pressure is sufficient to lubricate almost all of the bearings which will be encountered and the occasional bearing requiring a greater lubricant pressure is taken care of by automatic booster mechanism contained in the control valves and hereinafter described. This booster mechanism is capable of raising the lubricant pressure to 7000 or 8000 pounds per square inch, but this increased pressure is not communicated to the lubricant discharge hoses or lubricant compressors, so that these structures need only be designed to withstand a maximum pressure of 3000 pounds per square inch.

Because the high pressures of 7000 and 8000 pounds per square inch are limited to the boosters associated with the control valve and immediately adjacent the couplers 44, practically all of my novel lubricating system is exposed to relatively low pressures and can be made of inexpensive material produced by conventional and inexpensive manufacturing procedures.

In Fig. 1, I have shown four lubricant compressors as being operated by the primary fluid discharged by the pump 22. Each lubricant compressor is mounted in its own lubricant drum and these drums may contain the same or different lubricants. This showing, however, is merely diagrammatic, as more or less lubricant compressors can be operated by primary fluid from a single pump and other lubricant supply means may be provided in lieu of the conventional lubricant drums shown in this figure, although this particular arrangement is cheap, convenient and flexible and is very satisfactory from a commercial standpoint.

Referring to Fig. 2, it will be seen that the compressor 34 has a body 56 which may be conveniently formed as a casting and which provides a flange 36 overlying the opening 58 in the top 60 of the drum 38. The body 56 may be attached by bolts 62, or in any other suitable manner, to the drum top 60 to hold the compressor firmly in place during the lubricating operation. A sleeve 64 connects the body 56 with a second casting 66 adapted to be located well down into the drum 38 and carrying a cylindrical extension 68 which forms the lubricant inlet for the compressor. The extension 68 has a pair of openings 70 in its side walls adjacent the lower end thereof and lubricant entering these openings is fed upwardly past an inlet check valve 72 by a feeder 74 comprising an annular washer having a loose fit in the extension 68 and mounted on a reciprocating rod 76 attached to the lower end of a tube 78.

The check valve 72 is located in the lower end of the casting 66 and is guided therein by a triangular member 79 which limits lateral movement of the valve 72. The rod 76 extends through valve 72 and member 79 is threaded at its upper end into a ferrule 80, which in turn is threaded into the lower end of the tube 78. A bent pin 82 passes through tube 78, ferrule 80 and pin 76 to prevent relative rotation between any of these several parts. The casting 66 also carries a relief valve 84 which controls the return flow of lubricant from a lower pump chamber 86 into the lubricant drum.

The upper end of the tube 78 is attached to the lower end of a piston 88 slidable in a cylinder 90 threaded at its upper end in the body 56. This piston carries a check valve 92 which is urged towards its seat 94 by a pin 96. A spring 98 is confined between the pin 96 and a plug 100 screwed into the upper end of the piston. The tube 78 and piston 88 reciprocate as a unit and together constitute the discharge mechanism for forcing lubricant into the discharge hose 40 and thence to the bearings to be lubricated. This pumping mechanism is urged upwardly by a spring 102 confined between the casting 66 and a washer 104 resting against the shoulder 106 of a sleeve 108, which is welded or otherwise suitably attached to an intermediate portion of the tube 78.

A valve member 110 has a reduced lower end 112 threaded into the upper end 114 of sleeve 108 and secured in place by a lock nut 116. Valve member 110 has tapered passages 118 in the outer wall thereof and these passages communicate with an annular groove 120 having a shoulder 122 which cooperates with a sleeve 124 to control the flow of primary fluid.

Valve member 110 also has a bypass passage 126 therethrough and in the position of the parts shown in Fig. 2, this bypass passage is closed by a second valve member 128 having an annular valve seat 130 illustrated as engaging the end 132 of an extension 134 forming a unitary part of the valve member 110. A spring 136 urges valve member 128 away from the end of extension 124, thereby tending to permit free flow of primary fluid through bypass passage 126. This latter position of the parts is shown in Fig. 3.

The lower end of cylinder 90 is closed by an annular plate 138 which also closes the annular lubricant discharge passage 140 formed between the cylinder 90 and a sleeve 142 surrounding this cylinder and spaced therefrom. The lubricant discharge passage 140 communicates with the interior of cylinder 90 by way of ports 144. The upper end of sleeve 142 is threaded into the body 56 and the lower end of this sleeve is closed by an annular plate 146 which is welded or otherwise suitably secured to the lower end of the sleeve. Packing material 148 is located in the lower end of the sleeve 142 and this material is pressed firmly against the interior of the sleeve and the exterior of the tube 78 by a spring 150 confined between the annular plate 138 and a washer 152 which rests upon the packing material.

The larger sleeve 124 surrounds the sleeve 142 and forms an annular primary fluid passage 154 therebetween. The upper end of sleeve 124 is threaded into body 56 just below the primary fluid inlet 32 so that primary fluid under this inlet can enter the annular passage 154. Valve member 110 fits snugly in sleeve 124 and annular shoulder 122 of this valve member cooperates with the lower end of this sleeve to control the flow of primary fluid therethrough, as will be hereinafter more fully described.

The annular lubricant discharge passage 140 communicates with the outlet port 156 to which the lubricant discharge hose 40 is attached. A duct 158 connects lubricant discharge port 156 with the chamber 160 formed in a cap 162 attached to the upper end of the body 56. The lower end of chamber 160 communicates with the upper end of cylinder 164 formed in the body 56 and in alignment with the cylinder 90 heretofore referred to. A plunger 166 is located in the cylinder 164 and has an upwardly projecting stem 168. A nut 170 is threadedly attached to the upper end of the thread 168 and supports a washer 172 forming one abutment for a spring 174 whose lower end rests on the body 56. In Figs. 2 and 4, the plunger 166 is shown in retracted position, whereas in Fig. 3 this plunger is shown in extended position where it prevents complete return of the lubricant discharge piston 88 and tube 78 attached thereto.

A duct 176 connects the primary fluid inlet 32 with the upper end of the cylinder 90 so that the pressure of the primary fluid acts on the upper end of piston 88 which is provided with suitable packing 178 which prevents leakage of either primary fluid or lubricant past the piston. This primary fluid also acts on the lower end of plunger 166, which is also provided with suitable packing 180. After the primary fluid has passed downwardly through the sleeve 124 to the lower end of this sleeve, this fluid flows upwardly through the annular passage 182 between the sleeve 124 and tube 64 to primary fluid outlet 46.

A sleeve 184 is threaded into casting 66 and projects upwardly therefrom in spaced relation to the tube 78. A plug 186 closes the upper end of sleeve 184 and packing material 188 is pressed against this plug, tube 78, and the inner wall of sleeve 184 by a spring 190 confined between this packing material and an annulus 192 which is welded or otherwise secured to the sleeve 184. The sleeve 184 drives the lower pumping chamber 86 which communicates with the upper pumping chamber or cylinder 90 by way of tube 78, which has inlet ports 194 in its lower end.

In Fig. 2, I have shown a pipe T 196 as being interposed between the lubricant discharge outlet 156 and the lubricant discharge hose 40. A resilient reservoir 198 is attached to this T and comprises a hollow shell whose interior is in communication with the outlet 156 and hose 40. A piston 200 is located in this shell and is urged downwardly, that is, in lubricant discharging direction, by a heavy spring 202, which is adapted to yield at a pressure just slightly below the 3000 pounds maximum pressure which the lubricant compressor is designed to produce. This spring rests on a threaded plug 204 which may be adjusted to vary the tension of the spring. This plug is provided with an atmospheric vent 205.

The opposite end of the lubricant discharge hose 40 is connected to a rigid pipe 206 (Fig. 5) forming a part of the control valve 42. This pipe is threaded into a cast metal body 208, providing a chamber 210 into which the lubricant flows from the pipe 206. The outlet end of this chamber is normally closed by a valve 212 having a stem 214 terminating in an enlarged head 216. A spring 218 is confined between the head 216 and a washer 220 clamped between two threadedly engaged portions of the body 208 and this spring urges the valve 212 towards closed position.

The valve 212 is open by leftward movement of a pin 222 which passes through a suitable opening in a cap 224 threaded to the righthand end of the body 208. This pin is acted upon by the closed end 226 of a sleeve 228, which encloses the body 208 and is movable lengthwise thereof. A rigid grip 230 is affixed to the sleeve 228 and a lever 232 is pivotally connected to the grip 230 by a pin 234. The lever 232 has a stud 236 supporting a roller 238 which engages pipe 206.

The parts of the control valve are normally held in the position shown in Fig. 5 by spring 218. When it is desired to open the control valve, the operator places his hand around the grip 230 and lever 232 and then closes his hand to cause lever 232 to pivot about the point of engagement between wheel 238 and pipe 206. This moves grip 230 and sleeve 228 to the left, as viewed in Fig. 5. This movement is accompanied by a corresponding leftward movement of pin 222 and valve stem 214, so that valve 212 is moved to open position against the opposition of its spring 218.

Valve stem 214 has a longitudinally extending passage 240 and a cross passage 242 which connect the outlet side of the valve with the chamber 244 containing spring 218 and head 216. The control valve is thus balanced in so far as lubricant pressure is concerned, except for the small cross-section of the pin 222 and little manual force is required to open the valve and hold it in open position against the tension of the spring 218 and the lubricant pressure acting on the pin 222. This control valve is described and claimed in my co-pending application, Serial No. 454,667, filed August 13, 1942, now Patent No. 2,380,608, July 31, 1945, and requires no further description herein.

The lubricant discharged by the control valve passes through a booster mechanism 246 which is interposed between this control valve and the coupler 44. This booster mechanism comprises a casting 248 which is threadedly connected at one end to the coupler 44. The other end of the body 248 is attached to one end of a sleeve 250 whose other end is threaded to the body 208 of the control valve. The body 248 has a bore 252 therethrough, this bore being interrupted by an enlargement 254 and by annular grooves containing packing rings 256 and 258. A plunger tube 260 has its closed end 262 normally located in the enlargement 254 and ports 264 connect this enlargement with the interior of the tube 260. The righthand end of the plunger tube 260 is in open communication with the outlet chamber 266 of the control valve by way of openings 268 in a stop member 270 threadedly attached to the body 208 of the control valve.

A piston 272 is attached to the righthand end of the plunger tube 260 and a spring 274 confined between this piston and body 248 normally holds piston 272 and plunger tube 260 in contact with stop member 270, as shown in Fig. 5. A vent 276 connects the space containing the spring 274 with atmosphere to prevent piston 272 from becoming hydraulically locked through leakage of fluid therepast.

When a normal bearing is being lubricated, the parts of the booster mechanism remain in the position shown in Fig. 5 and lubricant flows through plunger tube 260, around the closed head thereof located in enlargement 254, and through bore 252 and coupler 44 to the bearing. If, however, the bearing should offer unusual resistance to any flow of lubricant, the lubricant pressure at the righthand end of the piston 272 will build up sufficiently to overcome the resistance of spring 274, whereupon piston 272 and plunger tube 260 will move to the left, causing the closed end 262 of this tube to enter bore 252 and cut off communication between the lefthand end of this bore and enlargement 254.

When this occurs, the lubricant in bore 252 ahead of the plunger tube is exposed to the full force of the 3000 pounds per square inch of lubricant pressure acting over the entire cross-sectional area of the piston 272 so that a pressure on the lubricant in the coupler 44 and fitting and bearing connected therewith may be raised to between 7000 and 8000 pounds per square inch. This lubricant pressure is usually adequate to overcome even the most stubborn bearing and as soon as the bearing resistance has once been broken down, the 3000 pounds pressure delivered by a lubricant compressor is adequate to continue to force lubricant into this bearing. Therefore, as soon as the bearing resistance is broken the piston 272 and plunger tube 260 return to the normal position shown in Fig. 5.

The operation of my novel lubricating system is as follows. With the motor 20 operating and the control valves of the several lubricant compressors in closed position, the parts of the several lubricant compressors assume the position shown in Fig. 3. In this position of the parts the primary fluid discharged from pump 22 flows through pipe 30 to lubricant inlet 32 downwardly through annular passage 154, through bypass 126 in valve member 110, upwardly through annular passage 182 to outlet 46 and thence through pipe 48 to the next compressor. Since all of the compressors are in the raised position, the primary fluid flows freely through each of these compressors and back to the revervoir 26 by way of pipe 54. The primary fluid is preferably a relatively light fluid, such for example, as turbine oil and since the lubricant compressors and pipes offer little resistance to the circulation of this fluid, only a small amount of power is consumed by the motor 20. The lubricant discharge hoses of the several compressors are under the maximum pressure which the compressors are capable of developing, for example, 3000 pounds per square inch, and this pressure is acting on the upper end of the plunger 166 and holds this plunger in lowered position, as shown in Fig. 3. Such position of the plunger 166 prevents spring 102 from returning lubricant piston 88 and tube 78 to fully returned position. In this idle position of Fig. 3, valve member 128 is separated from the upper end of valve member 110 so that the bypass 126 through the interior of the latter valve member is open to the primary fluid and permits free circulation of primary fluid between the inlets 32 and outlets 46 of the compressors.

As soon as the operator connects the coupler of a particular compressor to the fitting attached to a bearing of an automobile and opens the corresponding control valve, the pressure in the discharge hose drops and plunger 166 is moved upwardly by this spring 174 to the position shown in Fig. 4. This upward movement of the plunger 166 is accompanied by a corresponding upward movement of the piston 88 and tube 78 under the force of spring 102. As shown in Fig. 3, however, valve member 128 is resting against plate 146 and can not move upwardly with tube 78 and valve member 110. As tube 78 and valve member 110 move from the position of Fig. 3 to that of Fig. 4, the upper end of valve member 110 engages valve member 128 to close the primary fluid bypass 126 through valve member 110.

The primary fluid now can no longer flow freely between the inlet 32 and outlet 46. The full pressure of 750 pounds developed by the pump 22 is now available to act on the head of lubricant piston 88 and on valve member 110 to force the piston 88 and tube 78 downwardly. As tube 78 descends, lubricant is displaced from pump chamber 86 through inlet ports 194 into the interior of tube 78 and flows upwardly therethrough so that a corresponding amount of lubricant is discharged from the upper end of this tube past check valve 92 and into that part of lubricant discharge cylinder 90 which is located beneath the enlarged head of the piston 88. At the same time, the piston 88 is descending in its cylinder 90 and discharging lubricant therefrom by virtue of its own movement. The combined discharge flows from cylinder 90 through ports 144 and upwardly in annular passage 140 to the lubricant discharge port 156 and thence into discharge hose 40.

The effective area on which the primary fluid acts is the cross-sectional area of the cylinder 90 plus the difference in cross-sectional area between the interior of the sleeve 124 and the exterior of the tube 78, while the effective cross-sectional area of the lubricant pumping mechanism is the difference in cross-sectional area between the piston 88 and the feeder rod 76. In a particular embodiment of my invention I have made the effective area exposed to the primary fluid four times the effective area of the lubricant pumping mechanism, so that the pressure of the lubricant discharged by the pumping mechanism is four times that of the primary fluid and in this particular embodiment the pump 22 was designed to develop 750 pounds pressure on the primary fluid so that the maximum discharge pressure of the lubricant compressor is 3000 pounds per square inch. It is to be understood, however, that the foregoing areas and pressures may be varied as desired to meet any particular conditions or special needs.

If the particular bearing being lubricated offers only normal resistance, the parts of the booster mechanism remain in the position shown in Fig. 5. Should this bearing, however, offer abnormal resistance to any flow of lubricant, the plunger tube 260 and piston 272 will move to the left to trap lubricant in that part of bore 252 adjacent the coupler and force this lubricant into the bearing under greatly increased pressure. In the particular embodiment heretofore referred to, the sizes of the bore 252 and sleeve 250 and resistance of spring 274 are such that the booster increases the lubricant pressure from 3000 pounds per square inch to between 7000 and 8000 pounds per square inch. These figures likewise are to be considered as illustrative only, as these parts can be designed to increase the lubricant pressure to any desired amount.

The booster mechanism is designed so that it operates in less than one full discharge stroke of the lubricant compressor, and during the following return stroke of the lubricant compressor a suction is created in the lubricant discharge hose which permits the parts of the booster mechanism to return to normal position as shown in Fig. 5. Ordinarily only a single operation of the booster is required to open any one bearing and thereafter such additional lubricant as may be required by that bearing can be supplied at normal pressures below 3000 pounds per square inch.

When the piston 88 and tube 78 of the lubricant compressor have descended sufficiently to permit shoulder 122 of valve member 110 to pass below the lower end of tube 124, primary fluid can escape between this shoulder and the lower end of this tube and enter the lower end of bypass 126 in valve member 110. This position of the parts is shown in Fig. 2 and represents the end of the discharge stroke of the lubricant compressor. Valve member 128 is now exposed to substantially equal primary fluid pressure on opposite sides thereof, spring 136 moves this valve member upwardly and away from the upper end of valve member 110, thereby opening bypass 126 through this valve member. Primary fluid can now flow freely through this bypass 126 and spring 102 is now in a position to initiate the return movement of the piston 88 and tube 78.

During initial return movement of the pump mechanism, check valve 92 closes and there is a tendency to create a suction in the cylinder 90 as the piston 88 moves upwardly. Where the booster mechanism has operated or where the discharge hose 40 is under pressures approaching 3000 pounds per square inch, some lubricant will be returned to the cylinder 90 through ports 144. If, however, the lubricant in the discharge hose is under low pressure, check valve 92 may open to permit lubricant to be drawn into cylinder 90 from the upper end of tube 78.

As the lower end of tube 78 moves upwardly in chamber 86, a suction is created therein and feeder 74 forces lubricant past inlet valve 72 into this chamber. The feeder 74 is preferably so designed that it tends to supply much more lubricant to chamber 86 than this chamber can accommodate and the excess lubricant passes relatively freely between the periphery of feeder 74 and the inner walls of tubular extension 68. When the parts of the pumping mechanism reach the upper position shown in Fig. 4, the bypass 126 for the primary fluid is again closed by engagement of valve members 110 and 128 and the pumping stroke is commenced. The lubricant compressor continues to operate in this manner as long as its control valve is held open.

When the bearing has been satisfactorily lubricated, the operator releases the handle of the control valve, whereupon valve 212 closes and prevents further discharge of lubricant from the lubricant discharge hose. The pumping mechanism continues to operate until the maximum lubricant pressure of approximately 3000 pounds per square inch has been built up in the lubricant discharge hose and back of the plunger 166 to move this plunger into the lowered position shown in Fig. 3. When the plunger assumes this lowered position, return movement of the pumping mechanism is stopped before the primary fluid bypass 126 has closed. The primary fluid, therefore, may flow freely through this bypass and the pumping mechanism comes to rest in the position shown in Fig. 3.

If the plunger 166 should be moved to lower position and the maximum operating pressure attained in the discharge hose before the pumping mechanism reaches the lower end of its discharge stroke, relief valve 84 will open to permit discharge of lubricant from chamber 86 back into the lubricant container. Check valve 92, however, will prevent the flow of lubricant from the cylinder 90 down through tube 76 so that opening of the relief valve 84 will not provide an escape for lubricant in the cylinder 90. Continued downward movement of the piston 88, however, will force this lubricant from the cylinder 90 into the discharge hose and this excess lubricant will be absorbed by expansion of this hose.

As the pumping mechanism moves upwardly, some of the lubricant in the discharge hose flows back into the cylinder 90. This hose, however, is preferably so selected that this return of lubricant to the cylinder 90 will not relieve the pressure in the hose and above the plunger 166 sufficiently to permit return of this plunger to upper position. Plunger 166, therefore, remains in the position of Fig. 3 and stops upward movement of the pumping mechanism in the position shown in this figure.

The foregoing mode of operation requires that the discharge hose have an expansible capacity at substantially the maximum lubricant pressure developed by the compressor which is closely related to the capacity of the cylinder 90. This would require that characteristics of the discharge hose bear a definite relationship to the capacity of the lubricant compressor and would prevent the compressor from being used indiscriminately with different lengths and sizes of hose having different expansive capacities at or about 3000 pounds of lubricant pressure. In order to avoid this difficulty, I have shown in Fig. 2 a pressure reservoir interposed between the discharge outlet of the compressor and the discharge hose. This pressure reservoir has a spring pressed piston which yields at 3000 pounds per square inch to absorb any excess lubricant discharged by the compressor in completing its discharge stroke after the control valve has been closed. With such a pressure reservoir the compressor may be used with any length or size of hose.

From the foregoing description, it will be apparent that the piping through which the primary fluid circulates need only be capable of standing a pressure of 750 pounds per square inch and that the fittings and other parts of this piping installation can be formed of inexpensive material produced in large quantities by inexpensive methods of manufacture. The lubricant compressors themselves only develop pressures up to 3000 pounds per square inch and these compressors and the discharge hoses connected therewith need only be designed to withstand this pressure as a maximum. The increased pressure available for lubricating the exceptional bearing which requires more than 3000 pounds per square inch of lubricant pressure, is confined to the coupler and booster mechanism immediately connected thereto.

Any one of the several lubricant compressors can be operated at any time and these compressors may all be supplied with the same or different lubricants. After a lubricant compressor has been connected to a particular bearing, it ordinarily requires only a very brief interval of time to lubricate that bearing and much of the time spent in lubricating an automobile is utilized to disconnect the coupler from the fitting attached to one bearing and transferring it to the fitting attached to another bearing. While one compressor is thus being transferred from one bearing to another, a second compressor may be lubricating a third bearing of the same or a different vehicle. Where only slight resistance is encountered in the bearings, it would be possible to operate two or more of the compressors simultaneously but under most conditions of operation it would only be feasible to operate one compressor at a time.

While I have described my invention as being embodied in a lubricating system of a type particularly adapted for use in garages and service stations, my invention is not limited to such use and many features of my invention are capable of wide application. My invention is not to be construed as limited to the particular details shown and described, but includes all modifications and variations falling within the scope of the appended claims.

I claim:

1. A lubricating system of the class described, comprising a pump for circulating a primary fluid at a relatively low pressure, a plurality of lubricant compressors arranged in series and through which said primary fluid flows freely when such compressors are idle, said primary fluid providing the energy for operating said compressors, a lubricant discharge hose for each compressor, a control valve for controlling discharge of lubricant from each hose, lubricant compressing means forming a part of each lubricant compressor and adapted for actuation by said primary fluid, automatic mechanism for each compressor for cutting off free flow of primary fluid therethrough and causing said primary fluid to operate the lubricant compressing means of such compressor, said automatic mechanism being responsive to opening and closing of the control valve in the discharge hose of its compressor, and a separate source of lubricant for each lubricant compressor.

2. A hydraulic system of the class described, comprising a pump for circulating a primary fluid under pressure, a plurality of compressors connected to said pump, said compressors being arranged in series and when idle permitting free flow of primary fluid therethrough, a discharge conduit for each compressor, said compressors being operated by said primary fluid and being capable of discharging a secondary fluid or fluid-like medium at a pressure materially higher than that of said primary fluid, said compressors being connected in series in a primary fluid circulating system, a control valve for each compressor, lubricant compressing means forming a part of each lubricant compressor and adapted for actuation by said primary fluid, automatic mechanism for each compressor for cutting off free flow of primary fluid therethrough and causing said primary fluid to operate the lubricant compressing means of such compressor, said automatic mechanism being responsive to opening and closing of the control valve in the discharge hose of its compressor, and an automatic booster associated with each control valve and operated by energy supplied by said pump.

3. A system of the class described, comprising a gear pump, an electric motor for driving said pump, a reservoir for supplying primary fluid to said pump, a first compressor, a pipe connecting said pump and compressor, a second compressor, a second pipe connecting said compressors, means for returning primary fluid from said second compressor to said reservoir, pumping mechanism in each of said compressors operated by said primary fluid, normally open valve mechanism in each of said compressors for permitting free flow of primary fluid therethrough, a discharge conduit for each compressor, a control valve normally closing each of said conduits, means responsive to pressure in said conduits controlling the operation of said compressors, and an automatic booster on the outlet side of each control valve and operated by energy derived from said pump.

4. A compressor of the class described, comprising an upper pumping chamber and a lower pumping chamber, a tube connecting said chambers, means reciprocable in said chambers to discharge lubricant therefrom, said lower chamber discharging through said tube into said upper chamber, a discharge conduit communicating with said upper chamber, valve means for controlling discharge from said discharge conduit, and a movable stop for said reciprocable means, said stop including a variable chamber exposed to pressure in said discharge conduit and being moved thereby to stopping position.

5. A compressor of the class described, comprising a first pumping chamber, a piston reciprocable therein, means for conducting primary fluid to the upper side of said piston to force it downwardly and discharge lubricant thereneath, means including a second pumping chamber for supplying lubricant to the lower side of said piston, a valve member movable with said piston, means for subjecting one side of said valve member to primary fluid, and means cooperating with said valve member to form a bypass for primary fluid and relieve pressure on the upper side of said piston when said piston and valve member attain a predetermined position.

6. A lubricant compressor of the class described, comprising upper and lower pumping chambers, a piston in said upper chamber, a tube connected to said piston and extending into said lower chamber, said piston and tube being reciprocable to displace lubricant from said chambers, said tube conducting lubricant discharged from said lower chamber to said upper chamber, a discharge conduit connected to said upper chamber, a stop reciprocable in a wall of said upper chamber between an operative and an inoperative position, a spring for urging said stop in one direction, a second conduit connecting said stop with said discharge conduit whereby pressure in said discharge conduit tends to move said stop in opposition to its spring and to a position to engage said piston, and fluid means for reciprocating said piston and tube.

7. A compressor of the class described, comprising upper and lower pumping chambers, means for displacing material from said pumping chambers, said means including a reciprocable tube for conducting material from the lower chamber to the upper chamber, a valve member reciprocable with said tube, a sleeve forming a cylinder for said valve member, means for supplying primary fluid under pressure to said sleeve to create movement of said valve member and tube, a by-pass for said primary fluid through said valve member, a second valve member slidable relative to said tube and first valve member to control said by-pass, a spring for separating said valve members, and a stop for limiting movement of said second valve member in one direction.

8. A compressor of the class described, comprising a pumping cylinder, a piston reciprocable therein, a tube reciprocable with said piston and constituting an inlet for said cylinder, means for supplying primary fluid to one side of said piston to operate the same on a discharge stroke, a valve member reciprocable with said tube, a sleeve forming a cylinder for said valve member, means for admitting primary fluid to said sleeve, said valve member controlling operation of said piston by said primary fluid and having a sealing part movable beyond said sleeve to permit escape of primary fluid from said pumping cylinder and sleeve, and a spring for returning said piston and tube.

9. A compressor of the class described, comprising a pumping cylinder, means providing an outlet through which material may be discharged from said cylinder, a piston reciprocable therein, a tube reciprocable with said piston and constituting an inlet for said cylinder, means for supplying primary fluid to one side of said piston to move the same in one direction, a valve member reciprocable with said tube, a sleeve forming a cylinder for said valve member, means for admitting primary fluid to said sleeve, said valve member having a sealing part movable beyond said sleeve to permit escape of primary fluid from said pumping cylinder and sleeve, a spring for returning said piston and tube, a bypass through said valve member, a second valve member controlling flow of primary fluid through said bypass, and means for engaging and disengaging said valve members to open and close said bypass and thereby control operation of said piston.

10. A compressor of the class described, comprising a cylinder, a piston reciprocable therein, a spring for moving said piston in one direction, means to introduce fluid into said cylinder to move said piston in the opposite direction to discharge material from said cylinder, a discharge conduit receiving material discharged from said cylinder, a pressure reservoir communicating with said discharge conduit, a chamber in line with said cylinder, a conduit connecting said chamber and discharge conduit, a plunger interposed between said chamber and cylinder and adapted to be moved into said cylinder by pressure in said discharge conduit and chamber, and a spring for returning said plunger, said plunger forming a stop for said piston when urged into said cylinder by the pressure in said discharge conduit and pressure reservoir.

11. A lubricant compressor of the class described, comprising a head adapted to overlie the opening in the top of a lubricant drum, a depending tube attached to said head, a first pumping chamber formed in the upper end of said compressor, a second pumping chamber formed in the lower end of said compressor, reciprocable means for displacing lubricant from said chambers, said lower chamber serving as a source of lubricant supply for said upper chamber, a feeder for supplying excess lubricant to said lower chamber, a pressure release valve for said lower chamber, a one way check valve interposed between said chambers to prevent flow of lubricant from said upper chamber to said lower chamber, conduit means receiving lubricant discharge from said upper chamber, said conduit means having an expansive capacity at maximum pressure as great as the capacity of said upper chamber, and a control valve for regulating discharge of lubricant from said conduit means.

12. A compressor of the class described, comprising a pumping cylinder, a piston reciprocable therein, a tube connected to said piston and reciprocable therewith, said tube constituting an inlet for said cylinder, a sleeve surrounding said tube and cylinder, a valve member movable with said tube and forming a piston in said sleeve, means for introducing an operating fluid to said sleeve, said fluid acting on said valve member to move said piston and tube in one direction until a part of said valve member moves beyond an end of said sleeve to permit escape of said fluid, means for opening a bypass through said valve member, a spring for returning said tube and piston, and means for closing said bypass when said piston and tube have returned to initial position.

13. A compressor of the class described, comprising a pair of pumping chambers, connected means for displacing material from said chambers, said connected means including a tube for conducting material from one chamber to the other, a discharge conduit connected to said other chamber, a piston movable with said tube for operating said displacing means in one direction, a spring for returning said displacing means, a cylinder enclosing said piston, means for introducing fluid under pressure to said cylinder, and valve means controlling a by-pass and permitting said fluid to flow freely past said piston during return of said displacing means.

14. A compressor of the class described, comprising a first tube constituting a compression cylinder, means for introducing material into said cylinder, a second tube surrounding said first tube in spaced relation thereto and cooperating therewith to form a discharge passage for said cylinder, said first tube having openings connecting said passage with said cylinder, a third tube surrounding said second tube and cooperating therewith to form an inlet passage for operating fluid, a piston in said cylinder, a second piston beyond an end of said cylinder and located in said third tube, means connecting said pistons, a fourth tube surrounding said third tube and cooperating therewith to provide a discharge passage for said operating fluid, a spring for returning said pistons, and means for connecting said third and fourth tubes when said piston reaches a predetermined position to relieve the pressure of operating fluid on said piston.

15. A compressor of the class described, comprising a first tube constituting a compression cylinder, means for introducing material into said cylinder, a second tube surrounding said first tube in spaced relation thereto and cooperating therewith to form a discharge passage for said cylinder, said first tube having openings connecting said passage with said cylinder, a third tube surrounding said second tube and cooperating therewith to form an inlet passage for operating fluid, a piston in said cylinder, a second piston beyond an end of said cylinder and located in said third tube, means connecting said pistons, a fourth tube surrounding said third tube and cooperating therewith to provide a discharge passage for said operating fluid, a spring for returning said pistons, and by-pass means for said second piston, said bypass means connecting said third and fourth tubes to relieve the pressure of operating fluid on said piston.

16. A lubricant compressor of the class described, comprising a head, a first sleeve attached to said head and constituting a lubricant cylinder, a piston therein, a tube attached to said piston, said tube constituting a lubricant inlet for said cylinder, a check valve preventing reverse flow from said cylinder into said tube, a second sleeve surrounding said first sleeve and forming a discharge conduit for said cylinder, a third sleeve surrounding said second sleeve and forming a primary fluid passage, means for conducting primary fluid to the upper end of said passage and to the upper end of said cylinder, a fourth sleeve surrounding said third sleeve, a casting attached to the lower end of said fourth sleeve, a fifth sleeve located in the lower end of said fourth sleeve and surrounding said tube, said fifth sleeve providing a lubricant discharge chamber from which lubricant is discharged by movement of said tube, said casting providing a lubricant inlet, a valve controlling said inlet, a rod connected to said tube and passing through said valve, a lubricant feeder attached to said rod, a tubular member attached to said casting and cooperating with said feeder, a pressure relief valve for said chamber, a valve member reciprocable with said tube and forming a piston movable in said third sleeve, a spring for urging said tube and first-named piston in one direction, said valve member being movable by primary fluid pressure beyond the end of said third sleeve to permit escape of primary fluid between said third sleeve and said valve member, said third sleeve and fourth sleeve forming a primary fluid return passage, said valve member having a bypass therethrough, a second valve member controlling said bypass, a spring for separating said valve members, packing means surrounding said tube and preventing escape of lubricant from said first sleeve, said packing means constituting a stop for one of said valve members.

17. A lubricant compressor of the class described, comprising a head, a first sleeve attached to said head and constituting a lubricant cylinder, a piston therein, a tube attached to said piston, said tube constituting a lubricant inlet for said cylinder, a check valve preventing reverse flow from said cylinder into said tube, a second sleeve surrounding said first sleeve and forming a discharge conduit for said cylinder, a third sleeve surrounding said second sleeve and forming a primary fluid passage, means for conducting primary fluid to the upper end of said passage and to the upper end of said cylinder, a fourth sleeve surrounding said third sleeve, a casting attached to the lower end of said fourth sleeve, a fifth sleeve located in the lower end of said fourth sleeve and surrounding said tube, said fifth sleeve providing a lubricant discharge chamber from which lubricant is discharged by movement of said tube, said casting providing a lubricant inlet, a valve controlling said inlet, a rod connected to said tube and passing through said valve, a lubricant feeder attached to said rod, a tubular member attached to said casting and cooperating with said feeder, a pressure relief valve for said chamber, a valve member reciprocable with said tube and forming a piston movable in said third sleeve, a spring for urging said tube and first-named piston in one direction, said valve member being movable by primary fluid pressure beyond the end of said third sleeve to permit escape of primary fluid between said third sleeve and said valve member, said third sleeve and fourth sleeve forming a primary fluid return passage, said valve member having a bypass therethrough, a second valve member controlling said bypass, a spring for separating said valve members, packing means surrounding said tube and preventing escape of lubricant from said first sleeve, said packing means constituting a stop for one of said valve members, a cap attached to said head in alignment with said first sleeve, said cap having a pressure chamber therein, means connecting said pressure chamber with said discharge conduit, a movable plunger between said pressure chamber and first-mentioned cylinder, and exposed to the pressures therein, a stem attached to said plunger, and a spring surrounding said stem and urging said plunger toward retracted position, said plunger constituting a stop for said first-named piston and tube when the pressure in said discharge conduit reaches a predetermined value.

18. A compressor of the class described, comprising a first pumping chamber, a second pumping chamber constituting a priming chamber for said first pumping chamber, means extending into both of said pumping chambers simultaneously to displace material therefrom, said means providing a conduit for material from one of said pumping chambers to the other pumping chamber, and operating means attached to said last-named means intermediate said pumping chambers.

19. A compressor of the class described, comprising a first pumping chamber, a second pumping chamber constituting a priming chamber for said first pumping chamber, means extending into both pumping chambers simultaneously to displace material therefrom, an operating piston attached to said last-named means intermediate said pumping chambers, said first-named means providing a conduit for material from one pumping chamber to the other, and means for exerting fluid pressure on said piston to operate said first-named means.

20. A compressor of the class described, comprising a first pumping chamber, a second pumping chamber constituting a priming chamber for said first pumping chamber, means extending into said pumping chambers for simultaneously displacing material therefrom, said means providing a conduit for material from one pumping chamber to the other, a cylinder intermediate said pumping chambers, and a piston in said cylinder for reciprocating said means.

21. A lubricant compressor of the class described, comprising a first pumping chamber, a second pumping chamber constituting a priming chamber for said first pumping chamber, means extending into said pumping chambers for simultaneously discharging lubricant therefrom, said means providing a lubricant conduit from one pumping chamber to the other, a cylinder intermediate said pumping chambers, packing glands between said cylinder and said pumping chambers, and a piston in said cylinder for reciprocating said lubricant displacing means.

GEO. H. PALM.

REFERENCES CITED

The following references are of record in the file of this patent:

UNITED STATES PATENTS

| Number    | Name    | Date          |
|-----------|---------|---------------|
| 2,102,140 | Ungar   | Dec. 14, 1937 |
| 2,298,920 | Barks   | Oct. 13, 1942 |
| 1,896,036 | Bell    | Jan. 31, 1933 |
| 1,658,217 | Winkley | Feb. 7, 1928  |
| 2,205,667 | Plummer | June 25, 1940 |
| 2,312,857 | Woelfer | Mar. 2, 1943  |
| 2,357,029 | Smith   | Aug. 29, 1944 |

FOREIGN PATENTS

| Number  | Country | Date          |
|---------|---------|---------------|
| 421,130 | British | Dec. 14, 1934 |